(No Model.)

J. F. SHULTZ.
PLOW SHOVEL.

No. 493,389. Patented Mar. 14. 1893.

Witnesses
C. A. Ford.
J. H. Siggers

Inventor
Jacob F. Shultz.

By his Attorneys,
C. A. Snow & Co.

UNITED STATES PATENT OFFICE.

JACOB F. SHULTZ, OF SAN JACINTO, ASSIGNOR OF ONE-HALF TO GEORGE F. KERNAGHAN, OF PASADENA, CALIFORNIA.

PLOW-SHOVEL.

SPECIFICATION forming part of Letters Patent No. 493,389, dated March 14, 1893.

Application filed November 22, 1892. Serial No. 452,358. (No model.)

*To all whom it may concern:*

Be it known that I, JACOB F. SHULTZ, a citizen of the United States, residing at San Jacinto, in the county of San Diego and State of California, have invented a new and useful Plow-Shovel, of which the following is a specification.

My invention relates to improvements in plow-shovels; and more especially to that class thereof employed in gang-plows.

The objects of my invention are to produce a shovel especially designed for use in gang-plows, though capable of use elsewhere, and to so construct the same as to render it reversible, that is, to construct the shovel in rhomboidal-form and adapt the same to be used either side down; and finally to provide for a repointing of the shovel, and to obviate in such operation such a thinning or reduction of the metal or stock thereof as weakens or reduces the efficiency of the shovel and causes it to become readily dulled.

With these objects in view the invention consists primarily in producing a shovel having a rhomboidal shape whose cutting points are at the acute angles thereof, and in providing the opposite inclined edges of such shovel of increased thickness or with ribs upon its rear side whereby when it is necessary to repoint the same the operation may be accomplished without undue thinning of the material while at the same time the ribs strengthen the shovel, and do not to any material extent increase the thickness of the body-portion thereof.

Figure 1:
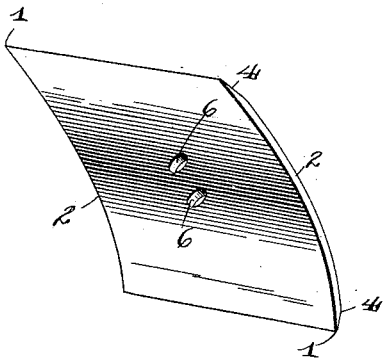
Figure 3:
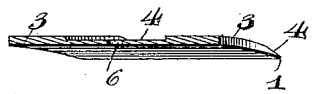
Figure 4:
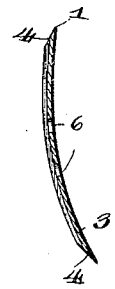
Figure 2:
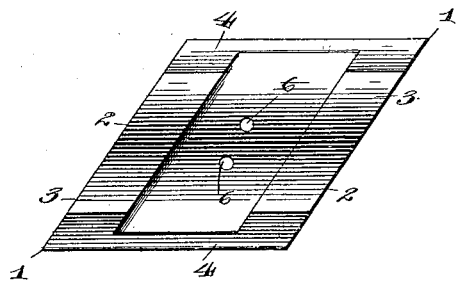

Referring to the drawings:—Figure 1 is a perspective view of a shovel constructed in accordance with my invention. Fig. 2 is a rear elevation. Fig. 3 is a transverse sectional view. Fig. 4 is a longitudinal sectional view.

Like numerals of reference indicate like parts in all the figures of the drawings.

The shovel is formed of suitable stock of proper gage and being of rhomboidal-shape, terminates at its acute angles in points 1. The shape given the shovel produces the opposite inclined edges 2, which form the front edge of the shovel when their respective points are brought into operation. These edges upon the rear sides of the shovel are provided with superficial ribs 3, or in other words metal is thickened or increased beyond the metal forming the body of the shovel or that portion thereof lying between the ribs. The upper and lower edges of the shovel are beveled to form cutting edges 4, while the entire shovel is curved or made concavo-convex in longitudinal-section so as to constitute a proper mold-board for turning the soil. The intermediate or body-portion of the shovel is provided with the usual bolt holes 6, whereby the same may be secured to the standard.

It will be seen that either side of the shovel may be used down or employed for operation, and that when the points become dulled by use they may be drawn out or the shovel repointed in the usual manner, and any such thinning or reduction of the points as will render the same liable to be readily turned or dulled and the shovel rendered inefficient, is avoided.

Heretofore shovels of this character have been formed of a uniform thickness, and the consequence has been that when a repointing of the same took place the points were so thinned or reduced as to destroy the efficiency of the shovel, and it would soon become bent, broken, or otherwise destroyed by contacting with hard clods of earth, stones, and other objects lying in its path.

The shovels of uniform thickness, now in use, have to be drawn to a point by a blacksmith, as the tendency is to wear rapidly into a circular shape. One of the material points in the improved shovel is that the superficial ribs prevent the more rapid wear at the point and heel of the shovel. The wear will be about equal all along the cutting edge, and for this reason the improved shovel will keep its shape much longer and obviate repairs by blacksmiths.

Having described my invention, what I claim is—

The herein described shovel, of rhomboidal-shape, whose acute angles form points, the same having its rear side along its inclined edges from its acute to its obtuse angles provided with superficial-ribs, between said ribs provided with a pair of perforations adapted to receive heel-bolts, and having its upper and lower edges beveled upon their rear sides, substantially as specified.

In testimony that I claim the foregoing as my own I have hereto affixed my signature in the presence of two witnesses.

JACOB F. SHULTZ.

Witnesses:
D. B. BAKER,
WILLIAM VAWTER.